United States Patent
Liu et al.

(10) Patent No.: US 11,970,655 B2
(45) Date of Patent: Apr. 30, 2024

(54) HIGH TEMPERATURE AND HIGH SALINITY-RESISTANT COMPLEMENTARILY RIGID-FLEXIBLE PLUGGING AGENT AND METHOD FOR PREPARING THE SAME AND WATER-BASED DRILLING FLUID AND USE THEREOF

(71) Applicant: China University of Petroleum (East China), Qingdao (CN)

(72) Inventors: Jingping Liu, Qingdao (CN); Jinsheng Sun, Qingdao (CN); Kaihe Lv, Qingdao (CN); Meichun Li, Qingdao (CN); Jintang Wang, Qingdao (CN); Jiafeng Jin, Qingdao (CN); Yingrui Bai, Qingdao (CN); Xianbin Huang, Qingdao (CN); Jian Li, Qingdao (CN); Shenglong Shi, Qingdao (CN)

(73) Assignee: CHINA UNIVERSITY OF PETROLEUM (EAST CHINA), Shandong (CN)

( * ) Notice: Subject to any disclaimer, the term of this patent is extended or adjusted under 35 U.S.C. 154(b) by 0 days.

(21) Appl. No.: 17/966,516

(22) Filed: Oct. 14, 2022

(65) Prior Publication Data
US 2024/0010904 A1    Jan. 11, 2024

(30) Foreign Application Priority Data
Jul. 5, 2022    (CN) .......................... 202210790278.8

(51) Int. Cl.
*C09K 8/24* (2006.01)
*C09K 8/42* (2006.01)
*E21B 21/00* (2006.01)

(52) U.S. Cl.
CPC ................ *C09K 8/24* (2013.01); *C09K 8/426* (2013.01); *E21B 21/003* (2013.01); *C09K 2208/10* (2013.01)

(58) Field of Classification Search
CPC ...... C09K 8/24; C09K 8/426; C09K 2208/10; E21B 21/003
See application file for complete search history.

(56) References Cited

FOREIGN PATENT DOCUMENTS

| CN | 105018051 | * | 11/2015 |
|----|-----------|---|---------|
| CN | 106978154 | A |  7/2017 |
| CN | 108384520 | A | * 8/2018 |
| CN | 109439298 | A |  3/2019 |
| CN | 110105941 | A |  8/2019 |
| CN | 111499790 | B | * 5/2021 |
| CN | 113355061 | A |  9/2021 |
| CN | 113528101 | A | * 10/2021 |
| CN | 113528101 | A |  10/2021 |

* cited by examiner

*Primary Examiner* — Kumar R Bhushan
(74) *Attorney, Agent, or Firm* — Calfee, Halter & Griswold LLP (57) ABSTRACT

A high temperature and high salinity-resistant complementarily rigid-flexible plugging agent, a method for preparing the same, and a water-based drilling fluid and a use thereof.

9 Claims, 2 Drawing Sheets

HIGH TEMPERATURE AND HIGH SALINITY-RESISTANT COMPLEMENTARILY RIGID-FLEXIBLE PLUGGING AGENT AND METHOD FOR PREPARING THE SAME AND WATER-BASED DRILLING FLUID AND USE THEREOF

PRIORITY CLAIM & CROSS REFERENCE

The application claims priority to Chinese Application No. 202210790278.8, filed on Jul. 5, 2022, entitled "a 240° C. high temperature and high salinity-resistant complementarily rigid-flexible plugging agent and method for preparing the same", which is herein specifically and entirely incorporated by reference.

FIELD

The present disclosure relates to the technical field of oilfield drilling, and particularly to a high temperature and high salinity-resistant complementarily rigid-flexible plugging agent, a method for preparing the same, and a water-based drilling fluid and an use thereof.

BACKGROUND

The existing plugging agents in the drilling fluids suffer from a large amount of failures in the high temperature and high salinity environments in deep formation, the drilling fluids move along micro-fractures and fractures and enter the deep formation, causing downhole troublesome conditions and accidents such as borehole wall collapse, lost circulation, sticking of a drilling tool, and reservoir damage, severely restraining the progress of oil & gas exploration and development, thereby resulting in heavy economic losses. Typically, the flexible organic materials have poor temperature resistance and salt tolerance; the rigid materials (e.g., silica, calcium carbonate) have strong resistance to high temperature and high salinity, but the rigid materials cannot effectively match the shape and size of the pores and fractures in the formation, thus the plugging effects are not satisfactory. CN113355061A discloses a soft-outside and rigid-inside oil-based drilling fluid nano blocking agent and an oil-based drilling fluid, but the blocking agent can only effectively improve the plugging property of drilling fluid at a temperature condition of 160° C.; CN113528101A discloses a lost circulation material with soft outside and rigid inside and a preparation method thereof, the material has a deformable capability, and is provided with a certain backbone support function, and can adaptively select the fractures with different sizes to form an effective plugging, but the lost circulation material has a large particle size, can hardly be effectively compatible with the drilling fluid; CN109439298A discloses a high-temperature-resistant and calcium-resistant water-based drilling fluid blocking agent for protecting an oil and gas reservoir and drilling fluid and application thereof, the plugging agent can exhibit desirable plugging properties under the conditions of a temperature of 200° C. and $CaCl_2$ solution with a concentration of 1%; CN106978154A discloses a while-drilling blocking agent capable of resisting high temperature of 220° C. for drilling fluid and a preparation method of the while-drilling blocking agent, the blocking agent is capable of meeting the requirements of drilling dry hot rock at 220° C.; CN110105941A discloses carbon microspheres serving as a blocking agent for high-temperature water-based drilling fluid, the blocking agent is stable under a high temperature condition of 200° C. However, the plugging agents do not show the blocking capability at higher temperature or under the condition with an added NaCl, and do not meet the requirements of well drilling under the conditions of ultra-high temperature and high salinity.

The complementarily rigid-flexible plugging material is provided with the advantages of high strength and strong adaptive capability, can overcome the aforementioned defects, thereby effectively plugging the deep formation with high temperature and high salinity.

SUMMARY

The present disclosure aims to overcome the defective problems in the prior art with respect to poor resistance to high temperature and salinity of the plugging agents, and provides a high temperature and high salinity-resistant complementarily rigid-flexible plugging agent, a method for preparing the same, and a water-based drilling fluid and an use thereof. The plugging agent has desirable dispersion and plugging properties under the conditions of ultra-high temperature and high salinity, and performs the effectively plugging function.

In order to achieve the above objects, a first aspect of the present disclosure provides a high temperature and high salinity-resistant complementarily rigid-flexible plugging agent, wherein the plugging agent is a dispersion emulsion comprising composite microspheres, wherein the composite microspheres comprise a rigid material and a flexible material coated on the surface of the rigid material; wherein the rigid material comprises modified nano-silica, and the flexible material comprises a polymer derived from copolymerization of water-soluble temperature-resistant monomer, oil-soluble temperature-resistant monomer and divinyl benzene co-monomer.

A second aspect of the present disclosure provides a method of high temperature and high salinity-resistant complementarily rigid-flexible plugging agent, including:
(1) Contacting a water-soluble temperature-resistant monomer, water with an emulsifier and dispersing the compounds to obtain a dispersion liquid;
(2) Contacting the dispersion liquid with a modified nano-silica and subjecting to an ultrasonic treatment to obtain a first solution;
(3) Mixing oil-soluble temperature-resistant monomer and divinyl benzene, and washing and treating the mixture with lye to obtain a second solution;
(4) Dropwise adding the second solution into the first solution in the presence of a RAFT chain transfer agent, so as to carry out a first reaction; and subsequently performing a second reaction in the presence of an initiator to prepare a complementarily rigid-flexible plugging agent.

A third aspect of the present disclosure provides a high temperature and high salinity-resistant complementarily rigid-flexible plugging agent prepared with the aforementioned preparation method.

A fourth aspect of the present disclosure provides a water-based drilling fluid, wherein the water-based drilling fluid comprises sodium bentonite and a plugging agent, wherein the plugging agent is the aforementioned high temperature and high salinity-resistant complementarily rigid-flexible plugging agent.

Due to the above-mentioned technical scheme, the present disclosure produces the technical characteristics and favorable effects as follows:

(1) The complementarily rigid-flexible plugging agent with resistance to high temperature of 240° C. and high salinity in the present disclosure is a dispersion emulsion of composite microspheres prepared with the raw materials water-soluble temperature-resistant monomer, oil-soluble temperature-resistant monomer, divinyl benzene and modified nano-silica (refer to FIG. 1), the plugging agent has desirable dispersion and plugging properties under the conditions of ultra-high temperature and high salinity, and performs the effectively plugging function under the conditions of ultra-high temperature of 240° C. and high salinity.

(2) The complementarily rigid-flexible plugging agent with resistance to high temperature of 240° C. and high salinity in the present disclosure introduces a RAFT (chain transfer) reagent to carry out polymerization with "active" free radical emulsion, so that the active substance chain group generates a reversible chain termination or chain transfer reaction, such that the active substance is inactivated to become a dormant species without growth activity, which can be split into active chain free radicals under synthetic conditions, thereby establishing a rapid dynamic equilibrium between active species and dormant species, thus the particle size distribution is narrowed and the particles are more uniform, the particle size of the plugging agent particles with the original particle size distribution of 10 nm-1 μm is concentrated in and the polymer is favorably coated on the silica; in addition, the divinyl benzene enhances strength of the polymer shell and improves the overall temperature resistance of the plugging agent.

(3) The exterior of the complementarily rigid-flexible plugging agent with resistance to high temperature of 240° C. and high salinity in the present disclosure is a flexible polymer soft shell, which has high elasticity and resilience, and can adapt to the size and shape of fractures in the formation. The molecular chain of the polymer soft shell contains the structural units with strong hydrophilicity provided by the water-soluble temperature-resistant monomer (e.g., acrylamide groups, sulfonic acid groups), and the existence of said structural units provided by the oil-soluble temperature-resistant monomer and divinyl benzene (e.g., benzene ring) improves the high temperature resistance of the molecules, the long carbon chain can form a hydrophobic association structure in water to improve the salt resistance of the treating agent; the core of said plugging agent is rigid nano-silica with the temperature and salinity resistance, it is used as the support skeleton to increase strength of said plugging agent. Under the action of pressure difference, the plugging agent can not only reduce the filtrate loss of drilling fluid, but also fill and deposit around the borehole wall to form an effective pressure-bearing plugging layer, thereby preventing pressure transmission and filtrate invasion.

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

As previously mentioned, a first aspect of the present disclosure provides a high temperature and high salinity-resistant complementarily rigid-flexible plugging agent, wherein the plugging agent is a dispersion emulsion comprising composite microspheres, wherein the composite microspheres comprise a rigid material and a flexible material coated on the surface of the rigid material; wherein the rigid material comprises modified nano-silica, and the flexible material comprises a polymer derived from copolymerization of water-soluble temperature-resistant monomer, oil-soluble temperature-resistant monomer and divinyl benzene co-monomer.

The inventors of the present disclosure have discovered that the complementarily rigid-flexible plugging agent made of temperature-resistant and salt-resistant polymer monomers and rigid silica particles has the advantages of both the rigid plugging agents and the flexible plugging agents, the flexible material shell is deformable under the stratum pressure, which can facilitate the plugging agent to enter the formation fractures; the rigid material can play a supporting role and effectively bear pressure and block, which enables the plugging agent to provide an efficient and adaptive plugging in regard to the formation under the premise of temperature resistance and salt resistance. In addition, an introduction of a RAFT reagent makes that the particle size distribution of the plugging agent is controllable; the precise control on particle size of the plugging agent can be achieved by adjusting the added amount of said RATF reagent and controlling the reaction temperature and time, such that the specific size of said plugging agent can be adjusted according to the actual conditions of the formation, the plugging effect on specific formation is further improved, the arrangements have very important significance in the engineering practice.

According to the present disclosure, a weight ratio of the content of the flexible material to the rigid material is 1:(0.01-0.5), preferably 1:(0.03-0.3).

According to the present disclosure, the composite microspheres have a diameter within a range of 10-1,000 nm, preferably 20-100 nm.

According to the present disclosure, the water-soluble temperature-resistant monomer is one or more selected from the group consisting of methylacrylic acid, acrylic acid, 2-acrylamide-2-methylpropanesulfonic acid, sodium vinyl sulfonate, sodium styrene sulfonate, N-vinylpyrrolidone, acrylonitrile and N,N-dimethylacrylamide; preferably, the water-soluble temperature-resistant monomer is one or more selected from the group consisting of 2-acrylamide-2-methylpropanesulfonic acid, N,N-dimethylacrylamide and N-vinylpyrrolidone.

According to the present disclosure, the oil-soluble temperature-resistant monomer is one or more selected from the group consisting of styrene, divinyl benzene, methyl methacrylate, methyl acrylate, ethyl methacrylate, ethyl acrylate, butyl methacrylate, butyl acrylate, isooctyl methacrylate, isooctyl acrylate, glycidyl methacrylate, octadecyl methacrylate and lauryl methacrylate; preferably, the oil-soluble temperature-resistant monomer is one or more selected from the group consisting of styrene, divinyl benzene, methyl methacrylate and lauryl methacrylate.

According to the present disclosure, the modified nano-silica is one or more selected from the group consisting of KH570 (γ-methacryloyloxytrimethoxysilane) modified nano-silica, coupling agent A151 (vinyltriethoxysilane) ($CH_2$=$CHSi(OC_2H_5)_3$) modified nano-silica and coupling agent Si69 (bis[γ-(triethoxysilyl)propyl]tetrasulfide) ($[(C_2H_5O)_3SiCH_2CH_2CH_2]_2S_4$) modified nano-silica.

According to the present disclosure, KH570 modified nano-silica can be prepared according to the following method:
1) Taking 0.3 g of sodium dodecyl sulfate, adding it to 100 g of water and stirring for 15 minutes, further adding 10 g of nano-silica under the mechanical stirring condition, and subjecting to ultrasonic dispersion for 30 minutes;
2) Transferring the liquid in step 1) into a three-necked flask, dropwise adding 1.8 g of KH570 under the stirring condition, heating to 70° C., and performing the reaction under stirring for 7 hours;
3) Lowering the temperature after the reaction is completed, subjecting the liquid to a suction filtration, washing the solid obtained by suction filtration with absolute ethanol, drying the solid to prepare the KH570 modified nano-silica.

According to the present disclosure, the coupling agent A151 modified nano-silica can be prepared according to the following method:
1) Taking 0.3 g of sodium dodecyl sulfate, adding it to 100 g of water and stirring for 15 minutes, further adding 10 g of nano-silica under the mechanical stirring condition, and subjecting to ultrasonic dispersion for 30 minutes;
2) Transferring the liquid in step 1) into a three-necked flask, dropwise adding 3.6 g of coupling agent A151 under the stirring condition, heating to 70° C., and performing the reaction under stirring for 6 hours;
3) Lowering the temperature after the reaction is completed, subjecting the liquid to a suction filtration, washing the solid obtained by suction filtration with absolute ethanol, drying the solid to prepare the coupling agent A151 modified nano-silica.

According to the present disclosure, the coupling agent Si69 modified nano-silica can be prepared according to the following method:
1) Taking 0.3 g of sodium dodecyl sulfate, adding it to 100 g of water and stirring for 15 minutes, further adding 10 g of nano-silica under the mechanical stirring condition, and subjecting to ultrasonic dispersion for 30 minutes;
2) Transferring the liquid in step 1) into a three-necked flask, dropwise adding 3.6 g of coupling agent Si69 under the stirring condition, heating to 70° C., and performing the reaction under stirring for 6 hours;
3) Lowering the temperature after the reaction is completed, subjecting the liquid to a suction filtration, washing the solid obtained by suction filtration with absolute ethanol, drying the solid to prepare the coupling agent Si69 modified nano-silica.

A second aspect of the present disclosure provides a method of high temperature and high salinity-resistant complementarily rigid-flexible plugging agent, including:
(1) Contacting a water-soluble temperature-resistant monomer, water with an emulsifier and dispersing the compounds to obtain a dispersion liquid;
(2) Contacting the dispersion liquid with a modified nano-silica and subjecting to an ultrasonic treatment to obtain a first solution;
(3) Mixing oil-soluble temperature-resistant monomer and divinyl benzene, and washing and treating the mixture with lye to obtain a second solution;
(4) Dropwise adding the second solution into the first solution in the presence of a RAFT chain transfer agent, so as to carry out a first reaction; and subsequently performing a second reaction in the presence of an initiator to prepare a complementarily rigid-flexible plugging agent.

According to the present disclosure, the water-soluble temperature-resistant monomer is used in an amount of 3-15 parts by weight, the emulsifier is used in an amount of 0.1-1 parts by weight; the modified nano-silica is used in an amount of 1-5 parts by weight, the oil-soluble temperature-resistant monomer is used in an amount of 5-30 parts by weight, the divinyl benzene is used in an amount of 1-8 parts by weight, the RAFT chain transfer agent is used in an amount of 0.01-0.05 parts by weight, and the initiator is used in an amount of 0.01-0.2 parts by weight, relative to 100-130 parts by weight of water; preferably, the water-soluble temperature-resistant monomer is used in an amount of 5-10 parts by weight, the emulsifier is used in an amount of 0.2-0.5 parts by weight; the modified nano-silica is used in an amount of 1-3 parts by weight, the oil-soluble temperature-resistant monomer is used in an amount of 10-20 parts by weight, the divinyl benzene is used in an amount of 2-6 parts by weight, the RAFT chain transfer agent is used in an amount of 0.01-0.03 parts by weight, and the initiator is used in an amount of 0.05-0.1 parts by weight, relative to 100-130 parts by weight of water According to the present disclosure, the emulsifier is one or more selected from the group consisting of sodium dodecyl benzenesulfonate, sodium dodecyl sulfate, OP-10 (dodecylphenol polyoxyethylene ether) and Tween-80 (polysorbate-80), preferably sodium dodecyl benzenesulfonate.

According to the present disclosure, the initiator is potassium persulfate.

According to the present disclosure, the RAFT chain transfer agent is benzyl N,N'-diethyldithiocarbamate (BDC).

In the present disclosure, the benzyl N,N'-diethyldithiocarbamate (BDC) is prepared according to the following process:
3-5 parts of sodium diethyldithiocarbamate and 0.5-2 parts of benzyl chloride are mixed, 100 parts of acetone is then added to fully dissolve the compounds, the mixture is then placed in an oil bath at 50° C., and subjected to stirring and reaction for 18-22 hours, the reactants are repeatedly washed with water, and subjected to the liquid separation to retain an oily substance, which is exactly the benzyl N,N'-diethyldithiocarbamate (BDC).

According to the present disclosure, the water-soluble temperature-resistant monomer is one or more selected from the group consisting of methylacrylic acid, acrylic acid, 2-acrylamide-2-methylpropanesulfonic acid, sodium vinyl sulfonate, sodium styrene sulfonate, N-vinylpyrrolidone, acrylonitrile and N,N-dimethylacrylamide.

According to the present disclosure, the oil-soluble temperature-resistant monomer is one or more selected from the group consisting of styrene, methyl methacrylate, methyl acrylate, ethyl methacrylate, ethyl acrylate, butyl methacrylate, butyl acrylate, isooctyl methacrylate, isooctyl acrylate, glycidyl methacrylate, octadecyl methacrylate and lauryl methacrylate.

According to the present disclosure, the modified nano-silica is one or more selected from the group consisting of γ-methylacryloyloxytrimethoxysilane modified nano-silica, coupling agent A151 modified nano-silica and coupling agent Si69 modified nano-silica.

According to the present disclosure, the dispersion liquid has a pH value of 7-8; the pH conditioning agent in the present disclosure is NaOH.

According to the present disclosure, the conditions of the ultrasonic treatment comprise: the ultrasonic frequency is 10-50 Hz, the temperature is 10-40° C., and the time is 10-50 min; preferably, the ultrasonic frequency is 20-40 Hz, the temperature is 15-30° C., and the time is 20-40 min.

In line with the present disclosure, the dropwise adding rate in step (4) is 5-20 mL/min, preferably 5-10 mL/min.

According to the present disclosure, the conditions of the first reaction comprise: the temperature is 50-80° C., and the time is 20-40 min; preferably, the temperature is 65-75° C., and the time is 25-35 min.

According to the present disclosure, the conditions of the second reaction comprise: the temperature is 50-80° C., and the time is 4-10 h; preferably, the temperature is 65-75° C., and the time is 5-8 h.

According to the present disclosure, the first reaction and the second reaction are preferably carried out at a stirring speed of 600-800 r/min.

According to a preferred embodiment of the present disclosure, the preparation method of the high temperature and high salinity-resistant complementarily rigid-flexible plugging agent provided by the present disclosure comprises the following steps:

1) Weighting 2-acrylamide-2-methylpropanesulfonic acid according to the formula, adding it into water and stirring until the compound is sufficiently dispersed, adding a pH conditioning agent to adjust the pH to 7-8, subsequently adding sodium dodecylbenzenesulfonate, stirring until the mixture is fully dispersed,
2) Adding modified nano-silica into the liquid obtained in step 1), and stirring and dispersing the mixture, then subjecting to ultrasonic dispersion for 30 minutes to obtain the solution a;
3) Weighting styrene and divinyl benzene according to the formula, stirring until the compounds are sufficiently blended, then using a NaOH solution to wash off the polymerization inhibitor MEHQ (hydroquinone monomethyl ether) to obtain the solution b;
4) Dropwise adding the solution b into the solution a under the high-speed stirring, further adding a RAFT reagent benzyl N,N'-diethyldithiocarbamate, maintaining the stirring process for 20-40 min;
5) Maintaining the stirring process and deoxygenating with nitrogen gas for 20-40 min;
6) Heating to 65-75° C., adding an initiator potassium persulfate, introducing nitrogen gas to carry out reaction for 5-8 h;
7) After the reaction is finished, keep stirring and stop heating. When the temperature drops to 30-40° C., the complementarily rigid-flexible plugging agent with resistance to high temperature of 240° C. and high salinity is prepared.

A third aspect of the present disclosure provides a high temperature and high salinity-resistant complementarily rigid-flexible plugging agent prepared with the aforementioned preparation method.

A fourth aspect of the present disclosure provides a water-based drilling fluid, wherein the water-based drilling fluid comprises sodium bentonite and a plugging agent, wherein the plugging agent is the aforementioned high temperature and high salinity-resistant complementarily rigid-flexible plugging agent.

According to the present disclosure, the plugging agent is used in an amount of 0.5-3 wt %, and the sodium bentonite is used in an amount of 2-6 wt %, based on a total weight of the water-based drilling fluid; preferably, the plugging agent is used in an amount of 1-2 wt %, and the sodium bentonite is used in an amount of 3-5 wt %, based on a total weight of the water-based drilling fluid.

A fifth aspect of the present disclosure provides an use of the aforementioned water-based drilling fluid in the process of drilling deep well and/or ultra-deep well.

The present disclosure will be described in detail below with reference to examples.

In the following Examples and Comparative Examples:

The characterization parameters of the water-based drilling fluids were measured according to the method described in the National Standard GB/T16783.1-2006 of China.

It should be noted in the present disclosure that the term "parts" in Examples and Comparative Examples denoted "parts by weight".

Example 1

The example served to illustrate the high temperature and high salinity-resistant complementarily rigid-flexible plugging agent prepared with the method of the present disclosure.

1) 5 parts of 2-acrylamide-2-methylpropanesulfonic acid was weighted and added into a flask containing 130 parts of water, and stirred at a stirring speed of 600 r/min until the compound was fully dispersed, the pH was adjusted to 7, 0.3 part of sodium dodecylbenzenesulfonate was then added and stirred until the compound was sufficiently dispersed;
2) 1 part of KH570 modified nano-silica was added into the liquid in step 1), and stirred for 10 minutes, subsequently subjected to ultrasonic dispersion for 30 minutes under the conditions including ultrasonic frequency of 30 Hz, to obtain the solution a;
3) 15 parts of styrene and 2 parts of divinyl benzene were weighted and stirred until the compounds were fully blended, NaOH solution was used to wash off impurities (e.g., a polymerization inhibitor), to obtain the solution b;
4) The solution b was dropwise added into the solution a at a dropwise addition rate of 5 mL/min under the high-speed stirring condition, 0.01 part of RAFT reagent benzyl N,N'-diethyldithiocarbamate was subsequently added and the stirring process was maintained for minutes;

5) The liquid in step 4) was added into a flask, and subjected to a high speed stirring at a stirring rate of 600 r/min, and deoxygenated with nitrogen gas for 30 minutes;
6) The temperature was raised to 70° C., 0.15 part of initiator potassium persulfate was added, nitrogen gas was introduced to carry out reaction for 6 hours;
7) After the reaction was finished, the stirring process was maintained and the heating was stopped. After the temperature was dropped to 30-40° C., the contents were poured out of the flask, and the obtained product was exactly the complementarily rigid-flexible plugging agent A1 with resistance to high temperature of 240° C. and high salinity.

Moreover, the KH570 modified nano-silica was prepared with the following method:
1) 0.3 g of sodium dodecyl sulfate was taken, added into 100 g of water and stirred for 15 minutes, 10 g of nano-silica was further added under the mechanical stirring condition, then subjected to ultrasonic dispersion for 30 minutes.
2) The liquid was transferred to a three-necked flask, 1.8 g of KH570 was dropwise added under the stirring conditions, the temperature was raised to 70° C., and subjected to stirring and reaction for 7 hours.
3) The temperature was lowered after the reaction was completed, the liquid was subjected to a suction filtration, the solid obtained by suction filtration was washed with absolute ethanol, the washed solid was subjected to drying such that the KH570 modified nano-silica was prepared.

Figure 1:
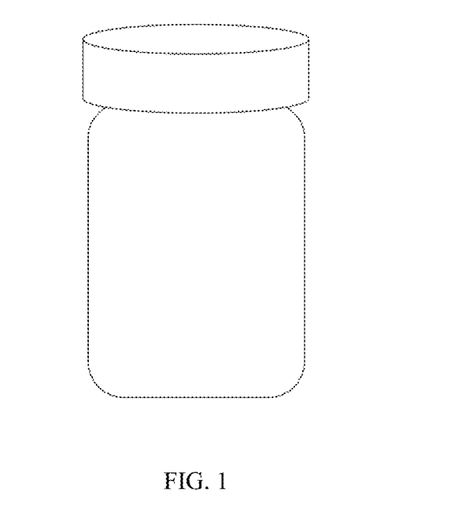
FIG. 1 shows a side elevation view of the rigid-flexible plugging agent as prepared in Example 1 of the present disclosure.

FIG. 1 illustrated the side elevation view of the rigid-flexible plugging agent as prepared in Example 1 of the present disclosure; as can be seen from FIG. 1 that the high temperature and high salinity-resistant complementarily rigid-flexible plugging agent was an uniform microsphere dispersion emulsion.

Figure 2:
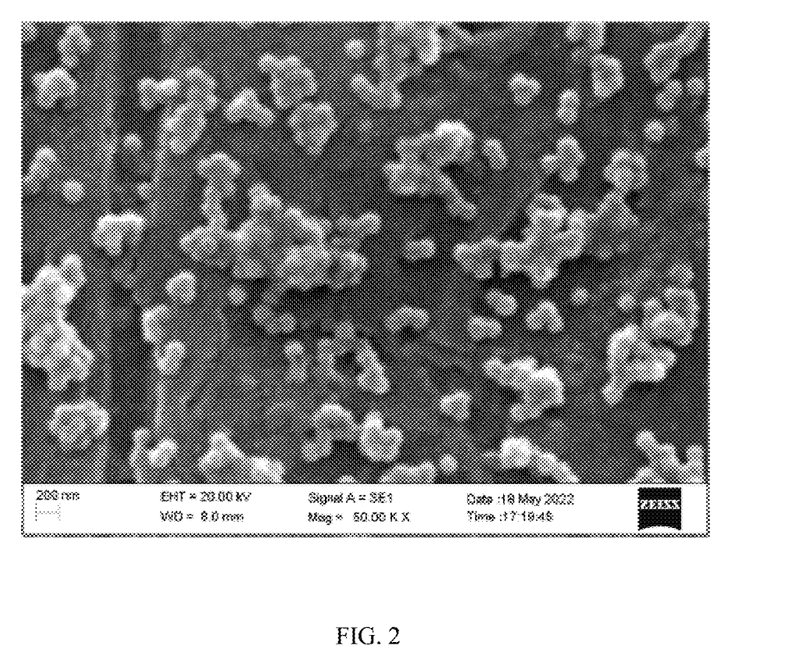
FIG. 2 illustrates the scanning electron microscope (SEM) photograph of the rigid-flexible plugging agent prepared in Example 1 of the present disclosure.

FIG. 2 illustrated the SEM photograph of the rigid-flexible plugging agent prepared in Example 1 of the present disclosure; as can be seen from FIG. 2: the plugging agent was composed of spherical particles with a particle size of 20-80 nm, and the brighter translucent polymer shell coated the relatively dark silica contained therein, the plugging agent particles were uniformly dispersed in the emulsion.

Figure 3:
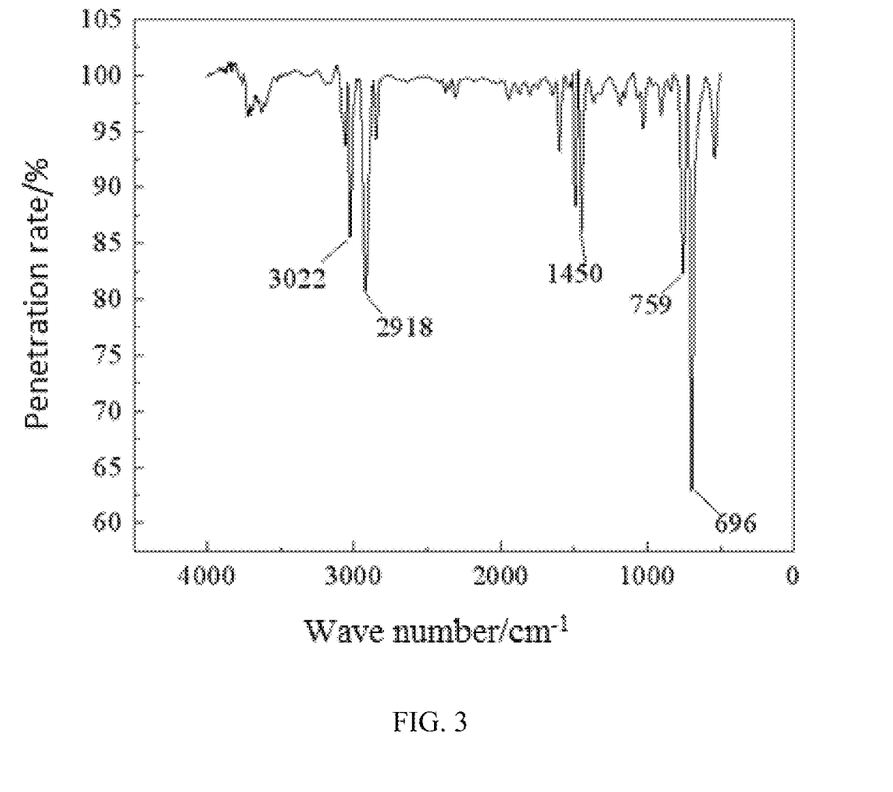
FIG. 3 illustrates the infrared spectrogram of the rigid-flexible plugging agent prepared in Example 1 of the present disclosure.

FIG. 3 illustrated the infrared spectrogram of the rigid-flexible plugging agent prepared in Example 1 of the present disclosure; as shown in FIG. 3, the characteristic absorption peak of —NH— was disposed at 3022 $cm^{-1}$, the characteristic absorption peak of —$CH_2$— was located at 2918 $cm^{-1}$, and the characteristic absorption peak of —NH— was resided at 1450 $cm^{-1}$, the characteristic absorption peaks proved that the polymerization reaction of 2-acrylamide-2-methylpropanesulfonic acid (AMPS) was performed; the characteristic double peaks of —C—O—C— were 759 $cm^{-1}$ and 696 $cm^{-1}$, which demonstrated that other monomers participated the polymerization reaction. It was thus proved that the drug monomers had successfully undergone the polymerization reaction, and the plugging agent was successfully synthesized.

Example 2

The example served to illustrate the high temperature and high salinity-resistant complementarily rigid-flexible plugging agent prepared with the method of the present disclosure.

1) 8 parts of 2-acrylamide-2-methylpropanesulfonic acid was weighted and added into a flask containing 130 parts of water, and stirred at a stirring speed of 600 r/min until the compound was fully dispersed, the pH was adjusted to 8, 0.4 part of sodium dodecylbenzenesulfonate was then added and stirred until the compound was sufficiently dispersed;
2) 1.5 parts of coupling agent A151 modified nano-silica was added into the liquid in step 1), and stirred for 10 minutes, subsequently subjected to ultrasonic dispersion for 30 minutes under the conditions including ultrasonic frequency of 30 Hz, to obtain the solution a;
3) 12 parts of styrene and 3 parts of divinyl benzene were weighted and stirred until the compounds were fully blended, NaOH solution was used to wash off the polymerization inhibitor, to obtain the solution b;
4) The solution b was dropwise added into the solution a at a dropwise addition rate of 5 mL/min under the high-speed stirring condition, 0.02 part of RAFT reagent benzyl N,N'-diethyldithiocarbamate was subsequently added and the stirring process was maintained for minutes;
5) The liquid in step 4) was added into a flask, and subjected to a high speed stirring at a stirring rate of 600 r/min, and deoxygenated with nitrogen gas for 30 minutes;
6) The temperature was raised to 75° C., 0.12 part of initiator potassium persulfate was added, nitrogen gas was introduced to carry out reaction for 5 hours;
7) After the reaction was finished, the stirring process was maintained and the heating was stopped. After the temperature was dropped to 30-40° C., the contents were poured out of the flask, and the obtained product was exactly the complementarily rigid-flexible plugging agent A2 with resistance to high temperature of 240° C. and high salinity.

Moreover, the coupling agent A151 modified nano-silica was prepared with the following method:
1) 0.3 g of sodium dodecyl sulfate was taken, added into 100 g of water and stirred for 15 minutes, 10 g of nano-silica was further added under the mechanical stirring condition, then subjected to ultrasonic dispersion for 30 minutes.
2) The liquid was transferred to a three-necked flask, 3.6 g of coupling agent A151 was dropwise added under the stirring conditions, the temperature was raised to 70° C., and subjected to stirring and reaction for 6 hours.
3) The temperature was lowered after the reaction was completed, the liquid was subjected to a suction filtration, the solid obtained by suction filtration was washed with absolute ethanol, the washed solid was subjected to drying such that the coupling agent A151 modified nano-silica was prepared.

Example 3

The example served to illustrate the high temperature and high salinity-resistant complementarily rigid-flexible plugging agent prepared with the method of the present disclosure.
1) 6 parts of 2-acrylamide-2-methylpropanesulfonic acid was weighted and added into a flask containing 130 parts of water, and stirred at a stirring speed of 600 r/min until the compound was fully dispersed, the pH was adjusted to 8, 0.3 part of sodium dodecylbenzenesulfonate was then added and stirred until the compound was sufficiently dispersed;

2) 1.2 parts of coupling agent Si69 modified nano-silica was added into the liquid in step 1), and stirred for 10 minutes, subsequently subjected to ultrasonic dispersion for 30 minutes under the conditions including ultrasonic frequency of 30 Hz, to obtain the solution a;

3) 10 parts of styrene and 3 parts of divinyl benzene were weighted and stirred until the compounds were fully blended, NaOH solution was used to wash off the polymerization inhibitor, to obtain the solution b;

4) The solution b was dropwise added into the solution a at a dropwise addition rate of 5 mL/min under the high-speed stirring condition, 0.015 part of RAFT reagent benzyl N,N'-diethyldithiocarbamate was subsequently added and the stirring process was maintained for minutes;

5) The liquid in step 4) was added into a flask, and subjected to a high speed stirring at a stirring rate of 600 r/min, and deoxygenated with nitrogen gas for 30 minutes;

6) The temperature was raised to 70° C., 0.12 part of initiator potassium persulfate was added, nitrogen gas was introduced to carry out reaction for 6 hours;

7) After the reaction was finished, the stirring process was maintained and the heating was stopped. After the temperature was dropped to 30-40° C., the contents were poured out of the flask, and the obtained product was exactly the complementarily rigid-flexible plugging agent A3 with resistance to high temperature of 240° C. and high salinity.

Moreover, the coupling agent Si69 modified nano-silica was prepared with the following method:

1) 0.3 g of sodium dodecyl sulfate was taken, added into 100 g of water and stirred for 15 minutes, 10 g of nano-silica was further added under the mechanical stirring condition, then subjected to ultrasonic dispersion for 30 minutes.

2) The liquid was transferred to a three-necked flask, 2.4 g of coupling agent Si69 was dropwise added under the stirring conditions, the temperature was raised to 70° C., and subjected to stirring and reaction for 6 hours.

3) The temperature was lowered after the reaction was completed, the liquid was subjected to a suction filtration, the solid obtained by suction filtration was washed with absolute ethanol, the washed solid was subjected to drying such that the coupling agent Si69 modified nano-silica was prepared.

Comparative Example 1

The plugging agent was prepared according to the same method as that in Example 1, except that the divinyl benzene monomer was not added.

Comparative Example 2

The plugging agent was prepared according to the same method as that in Example 1, except that the RAFT reagent monomer was not added.

Comparative Example 3

The plugging agent was prepared according to the same method as that in Example 1, except that the added amount of the RATF reagent was more than 0.03 part by weight, and the specific addition amount was 0.06 part by weight.

Comparative Example 4

The plugging agent was prepared according to the same method as that in Example 1, except that the used amount of water-soluble monomer was more than that of oil-soluble monomer, and the specific proportions were as follows: 18 parts of 2-acrylamide-2-methylpropanesulfonic acid, 2 parts of styrene, and 2 parts of divinyl benzene.

Comparative Example 5

The plugging agent was prepared according to the same method as that in Example 1, except that the RAFT reagent was added in step 6) after the temperature was raised to 70° C.

Test Example 1

The properties of the complementarily rigid-flexible plugging agents prepared in Examples 1-3 and Comparative Examples 1-5 were tested, and the results were shown in Table 1.

TABLE 1

| No. | Weight ratio of the content of the rigid material to the flexible material | Diameter range of the composite microspheres (nm) |
| --- | --- | --- |
| Example 1 | 1:22 | 20-60 |
| Example 2 | 3:46 | 30-70 |
| Example 3 | 6:95 | 40-90 |
| Comparative Example 1 | 1:22 | 100-1500 |
| Comparative Example 2 | 1:22 | 30-800 |
| Comparative Example 3 | 1:22 | Non-spherical |
| Comparative Example 4 | 1:22 | Non-spherical |
| Comparative Example 5 | 1:22 | 80-1000 |

Application Example 1

Preparation of the Drilling Fluid F1

4 parts by mass of sodium bentonite was added into 100 parts of water, and stirred at a high speed for 20 minutes, then subjected to standing still at room temperature for 24 hours, the bentonite slurry was further stirred for 20 minutes, 2 parts of the plugging agent $A_1$ in Example 1 was added, subsequently stirred and mixed uniformly to prepare the drilling fluid F1.

Application Example 2

Preparation of the Drilling Fluid F2

4 parts by mass of sodium bentonite was added into 100 parts of water, and stirred at a high speed for 20 minutes, then subjected to standing still at room temperature for 24 hours, the bentonite slurry was further stirred for 20 minutes, 2 parts of the plugging agent $A_2$ in Example 2 was added, subsequently stirred and mixed uniformly to prepare the drilling fluid F2.

Application Example 3

Preparation of the Drilling Fluid F3

4 parts by mass of sodium bentonite was added into 100 parts of water, and stirred at a high speed for 20 minutes, then subjected to standing still at room temperature for 24 hours, the bentonite slurry was further stirred for 20 minutes, 2 parts of the plugging agent $A_3$ in Example 3 was added, subsequently stirred and mixed uniformly to prepare the drilling fluid F3.

Application Example 4

Preparation of the Drilling Fluid F4

4 parts by mass of sodium bentonite was added into 100 parts of water, and stirred at a high speed for 20 minutes, then subjected to standing still at room temperature for 24 hours, the bentonite slurry was further stirred for 20 minutes, 2 parts of the plugging agent $A_1$ in Example 1 was added, the NaCl was further added at an amount of 35% by weight, subsequently stirred and mixed uniformly to prepare the drilling fluid F4.

Application Example 5

Preparation of the Drilling Fluid F5

4 parts by mass of sodium bentonite was added into 100 parts of water, and stirred at a high speed for 20 minutes, then subjected to standing still at room temperature for 24 hours, the bentonite slurry was further stirred for 20 minutes, 2 parts of the plugging agent $A_2$ in Example 2 was added, the NaCl was further added at an amount of 35% by weight, subsequently stirred and mixed uniformly to prepare the drilling fluid F5.

Application Example 6

Preparation of the Drilling Fluid F6

4 parts by mass of sodium bentonite was added into 100 parts of water, and stirred at a high speed for 20 minutes, then subjected to standing still at room temperature for 24 hours, the bentonite slurry was further stirred for 20 minutes, 2 parts of the plugging agent $A_3$ in Example 3 was added, the NaCl with a concentration of 35 wt % was further added, subsequently stirred and mixed uniformly to prepare the drilling fluid F6.

Application Comparative Examples 1-5

Preparation of the Drilling Fluids DF1-DF5

The drilling fluids DF1-DF5 were prepared according to the method in the Application Example 4, except that "the plugging agent $A_1$ in Example 1" was replaced by "the plugging agents DA1-DA5 prepared in the Comparative Examples 1-5" respectively, so as to prepare the drilling fluids DF1-DF5.

Application Comparative Example 6

Preparation of the Drilling Fluid DF6

4 parts by mass of sodium bentonite was added into 100 parts of water, and stirred at a high speed for 20 minutes, then subjected to standing still at room temperature for 24 hours, the bentonite slurry was further stirred for 20 minutes, the plugging agent was not added.

Application Comparative Example 7

Preparation of the Drilling Fluid DF7

4 parts by mass of sodium bentonite was added into 100 parts of water, and stirred at a high speed for 20 minutes, then subjected to standing still at room temperature for 24 hours, the bentonite slurry was further stirred for 20 minutes, the NaCl was further added at an amount of 35% by weight.

Application Comparative Example 8

Preparation of the Drilling Fluid DF8

4 parts by mass of sodium bentonite was added into 100 parts of water, and stirred at a high speed for 20 minutes, then subjected to standing still at room temperature for 24 hours, the bentonite slurry was further stirred for 20 minutes, 2 parts of polystyrene microsphere plugging agent was subsequently added.

Wherein the polystyrene microsphere plugging agent was prepared according to the following method:
1) 15 parts of styrene was weighted, NaOH solution was used to wash off the polymerization inhibitor, then dropwise added into a flask containing 130 parts of water, the stirring process was maintained, and deoxygenated with nitrogen gas for 30 minutes.
2) The liquid in flask was heated to 70° C. while keeping the stirring process, 0.05-0.1 part of initiator potassium persulfate was added, nitrogen gas was introduced to carry out reaction for 12 h.
3) After the reaction was finished, the stirring process was maintained and the heating was stopped. After the temperature was dropped to 30-40° C., the contents were poured out of the flask, and the obtained product was exactly the polystyrene microsphere plugging agent.

Application Comparative Example 9

Preparation of the Drilling Fluid DF9

4 parts by mass of sodium bentonite was added into 100 parts of water, and stirred at a high speed for 20 minutes, then subjected to standing still at room temperature for 24 hours, the bentonite slurry was further stirred for 20 minutes, 2 parts of polystyrene microsphere plugging agent was added, and the NaCl was further added at an amount of 35% by weight.

Application Comparative Example 10

Preparation of the Drilling Fluid DF10

4 parts by mass of sodium bentonite was added into 100 parts of water, and stirred at a high speed for 20 minutes, then subjected to standing still at room temperature for 24 hours, the bentonite slurry was further stirred for 20 minutes, 2 parts of KH570 modified nano-silica was added.

Application Comparative Example 11

Preparation of the Drilling Fluid DF11

4 parts by mass of sodium bentonite was added into 100 parts of water, and stirred at a high speed for 20 minutes, then subjected to standing still at room temperature for 24 hours, the bentonite slurry was further stirred for 20 minutes, 2 parts of KH570 modified nano-silica was added, and the NaCl was further added at an amount of 35% by weight.

Test Example

Performance Test of Drilling Fluids 400 mL of the drilling fluids F1-F6 and DF1-DF11 were taken respectively, and stirred at a rotational speed of 5,000 rpm for 20 min, then put in an ageing can, placed in a roller furnace and rolled for 16 hours under a constant temperature of 240° C., subsequently taken out and cooled to room temperature, and further stirred at a rotational speed of 5,000 rpm for 20 min, the apparent viscosity (AV, mPa·s), plastic viscosity (PV, mPa·s), dynamic shear force (YP, Pa), Medium pressure API filtrate loss ($FL_{API}$, mL) and sand bed invasion depth (80-100 mesh)/cm, the test results were shown in the following Table 2:

TABLE 2

| Drilling fluids | AV, mPa · s | PV, mPa · s | YP, Pa | $FL_{API}$, mL | Sand bed invasion depth (80-100 mesh)/cm |
|---|---|---|---|---|---|
| F1 | 10.5 | 7.5 | 3 | 26 | 3.8 |
| F2 | 10 | 7.5 | 2.5 | 32 | 4.4 |
| F3 | 10 | 8 | 2 | 30 | 4.2 |
| F4 | 12.5 | 7 | 5.5 | 140 | 2.1 |
| F5 | 11.5 | 7.5 | 4 | 156 | 2.9 |
| F6 | 12 | 8 | 4 | 148 | 2.6 |
| DF1 | 16 | 9 | 7 | 196 | 6.8 |
| DF2 | 14 | 9 | 5 | 188 | 6.4 |
| DF3 | 64 | 54 | 10 | 182 | Lost circulation |
| DF4 | 68 | 52 | 16 | 170 | Lost circulation |
| DF5 | 14.5 | 10 | 4.5 | 190 | 6.8 |
| DF6 | 9 | 6 | 3 | 46 | 11.5 |
| DF7 | 11.5 | 10 | 1.5 | 256 | Lost circulation |
| DF8 | 9.5 | 8 | 1.5 | 40 | 9.6 |
| DF9 | 10 | 8.5 | 1.5 | 238 | Lost circulation |
| DF10 | 9 | 8.5 | 0.5 | 42 | Lost circulation |
| DF11 | 11 | 9 | 2 | 228 | 8.9 |

As indicated by the data in Table 2, when the complementarily rigid-flexible plugging agents with resistance to high temperature of 240° C. and high salinity in the present disclosure are used as the drilling fluids, the rheological properties do not change greatly, the API filtrate loss can be reduced by 45%, and the sand bed invasion depth in the plugging experiments is drastically reduced by 80%, the drilling fluids can effectively block the sand bed of 80-100 mesh under the conditions consisting of a temperature of 240° C. and NaCl in an amount of 35%.

Both the ordinary modified nano-silica rigid plugging agent and the polystyrene microsphere flexible plugging agent are ineffective under the conditions consisting of a temperature of 240° C. and NaCl in an amount of 35%, however, the complementarily rigid-flexible plugging agents with resistance to ultra-high temperature and high salinity can perform the excellent plugging functions under the conditions consisting of a temperature of 240° C. and NaCl in an amount of 35%.

To sum up, the complementarily rigid-flexible plugging agents with resistance to ultra-high temperature and high salinity of the present disclosure can effectively improve the plugging performance of the drilling fluids under the conditions of high temperature and high salinity, and meet the requirements of drilling deep well and/or ultra-deep well.

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. A high temperature and high salinity-resistant complementarily rigid-flexible plugging agent, wherein the plugging agent is a dispersion emulsion comprising composite microspheres, wherein the composite microspheres comprise a rigid material and a flexible material coated on the surface of the rigid material;
wherein the composite microspheres have a diameter within a range of 20-60 nm or 30-70 nm;
wherein the plugging agent has a maximum temperature resistance of 240° C. and a maximum salinity resistance of 35% NaCl by percent weight;
wherein the rigid material comprises modified nano-silica, and the flexible material comprises a polymer derived from copolymerization of water-soluble temperature-resistant monomer, oil-soluble temperature-resistant monomer and divinyl benzene co-monomer;
wherein the water-soluble temperature-resistant monomer is one or more selected from the group consisting of methylacrylic acid, acrylic acid, 2-acrylamide-2-methylpropanesulfonic acid, sodium vinyl sulfonate, sodium styrene sulfonate, N-vinylpyrrolidone, acrylonitrile, and N,N-dimethylacrylamide;
wherein the oil-soluble temperature-resistant monomer is one or more selected from the group consisting of styrene, methyl methacrylate, methyl acrylate, ethyl methacrylate, ethyl acrylate, butyl methacrylate, butyl acrylate, isooctyl methacrylate, isooctyl acrylate, glycidyl methacrylate, octadecyl methacrylate and lauryl methacrylate; and
wherein the modified nano-silica is one or more selected from the group consisting of γ-methylacryloxytrimethoxysilane-modified nano-silica, vinyltriethoxysilane-modified nano-silica and bis[γ-(triethoxysilyl)propyl]tetrasulfide-modified nano-silica;
wherein a method of preparing the plugging agent includes:
(1) contacting the water-soluble temperature-resistant monomer with an emulsifier and dispersing the water-soluble temperature-resistant monomer and the emulsifier to obtain a dispersion liquid;
(2) contacting the dispersion liquid with a modified nano-silica and subjecting the dispersion liquid and the modified nano-silica to an ultrasonic treatment to obtain a first solution;
(3) mixing the oil-soluble temperature-resistant monomer and divinyl benzene, and washing and treating the mixture with lye to obtain a second solution;
(4) dropwise adding the second solution into the first solution in the presence of a RAFT chain transfer agent, so as to carry out a first reaction; wherein the RAFT chain transfer agent is benzyl N,N'-diethyldithiocarbamate; and subsequently performing a second reaction in the presence of an initiator to prepare a complementarily rigid-flexible plugging agent;

wherein the water-soluble temperature-resistant monomer is used in an amount of 3-15 parts by weight, the emulsifier is used in an amount of 0.1-1 parts by weight, the modified nano-silica is used in an amount of 1-5 parts by weight, the oil-soluble temperature-resistant monomer is used in an amount of 5-30 parts by weight, the divinyl benzene is used in an amount of 1-8 parts by weight, the RAFT chain transfer agent is used in an amount of 0.01-0.05 parts by weight, and the initiator is used in an amount of 0.01-0.2 parts by weight, relative to 100-130 parts by weight of water.

2. The plugging agent of claim 1, wherein a weight ratio of the content of the flexible material to the rigid material is 1:(0.01-0.5).

3. The plugging agent of claim 2, wherein a weight ratio of the content of the flexible material to the rigid material is 1:(0.03-0.3).

4. The plugging agent of claim 1, wherein the water-soluble temperature-resistant monomer is one or more selected from the group consisting of 2-acrylamide-2-methylpropanesulfonic acid, N,N-dimethylacrylamide and N-vinylpyrrolidone; and
wherein the oil-soluble temperature-resistant monomer is one or more selected from the group consisting of styrene, divinyl benzene, methyl methacrylate, and lauryl methacrylate.

5. The plugging agent of claim 1, wherein the emulsifier is one or more selected from the group consisting of sodium dodecyl benzenesulfonate, sodium dodecyl sulfate, dodecylphenlo polyoxyethylene ether, and polysorbate-80;
the water-soluble temperature-resistant monomer is one or more selected from the group consisting of methyl acrylic acid, acrylic acid, 2-acrylamide-2-methylpropanesulfonic acid, sodium vinyl sulfonate, sodium styrene sulfonate, N-vinylpyrrolidone, acrylonitrile and N,N-dimethylacrylamide;

the oil-soluble temperature-resistant monomer is one or more selected from the group consisting of styrene, methyl methacrylate, methyl acrylate, ethyl methacrylate, ethyl acrylate, butyl methacrylate, butyl acrylate, isooctyl methacrylate, isooctyl acrylate, glycidyl methacrylate, octadecyl methacrylate and lauryl methacrylate;
the modified nano-silica is one or more selected from the group consisting of vinyltriethoxysilane-modified nano-silica and bis-[γ-(triethoxysilyl)propyl]tetrasulfide-modified nano-silica.

6. The plugging agent of claim 1, wherein the dispersion liquid has a pH value of 7-8;
the conditions of the ultrasonic treatment comprise: the ultrasonic frequency is 10-50 Hz, the temperature is 10-40° C., and the time is 10-50 min;
the dropwise adding rate in step (4) is 5-20 mL/min;
the conditions of the first reaction comprise: the temperature is 50-80° C., and the time is 20-40 min;
the conditions of the second reaction comprise: the temperature is 50-80° C., and the time is 4-10 h;
the first reaction and the second reaction are carried out at a stirring speed of 600-800 r/min.

7. A water-based drilling fluid comprising sodium bentonite and a plugging agent, wherein the plugging agent is the high temperature and high salinity-resistant complementarily rigid-flexible plugging agent in claim 1.

8. The water-based drilling fluid of claim 7, wherein the plugging agent is used in an amount of 0.5-3 wt %, and the sodium bentonite is used in an amount of 2-6 wt %, based on a total weight of the water-based drilling fluid.

9. The water-based drilling fluid of claim 8, wherein the plugging agent is used in an amount of 1-2 wt %, and the sodium bentonite is used in an amount of 3-5 wt %, based on the total weight of the water-based drilling fluid.

* * * * *